(12) United States Patent
Liu et al.

(10) Patent No.: US 8,800,932 B2
(45) Date of Patent: Aug. 12, 2014

(54) MEDIUM EARTH ORBIT CONSTELLATION WITH SIMPLE SATELLITE NETWORK TOPOLOGY

(75) Inventors: Xiangdong Liu, Boyds, MD (US); Joshua Schachter, Dallas, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 732 days.

(21) Appl. No.: 12/843,417

(22) Filed: Jul. 26, 2010

(65) Prior Publication Data

US 2012/0018585 A1    Jan. 26, 2012

(51) Int. Cl.
*B64G 1/10* (2006.01)

(52) U.S. Cl.
USPC ..................................................... 244/158.4

(58) Field of Classification Search
USPC ........... 244/158.4, 158 R; 701/531; 455/3.05, 455/426.1, 517
See application file for complete search history.

(56) References Cited

U.S. PATENT DOCUMENTS

| | | | |
|---|---|---|---|
| 3,243,706 A | 3/1966 | Grisham | |
| 5,433,726 A | 7/1995 | Horstein et al. | |
| 5,439,190 A | 8/1995 | Horstein et al. | |
| 5,551,624 A | 9/1996 | Horstein et al. | |
| 5,602,838 A | 2/1997 | Kartalopoulos | |
| 5,625,363 A | 4/1997 | Spilker | |
| 5,641,134 A * | 6/1997 | Vatt | 455/12.1 |
| 5,867,783 A | 2/1999 | Horstein et al. | |
| 5,890,679 A | 4/1999 | Chethik | |
| 5,911,389 A * | 6/1999 | Drake | 244/158.4 |
| 5,979,830 A | 11/1999 | Kellermeier | |
| 6,032,041 A | 2/2000 | Wainfan et al. | |
| 6,104,911 A | 8/2000 | Diekelman | |
| 6,267,329 B1 | 7/2001 | Chethik | |
| 6,314,269 B1 | 11/2001 | Hart et al. | |
| 6,591,084 B1 * | 7/2003 | Chuprun et al. | 455/3.05 |
| 6,609,002 B1 | 8/2003 | Krishnamurthy et al. | |
| 6,684,056 B1 * | 1/2004 | Emmons et al. | 455/12.1 |
| 6,726,152 B2 | 4/2004 | Higgins | |
| 6,788,917 B1 | 9/2004 | Refai et al. | |
| 7,324,056 B2 * | 1/2008 | Wesel | 343/766 |
| 2001/0045494 A1* | 11/2001 | Higgins | 244/158 R |
| 2002/0136191 A1* | 9/2002 | Draim et al. | 370/344 |
| 2003/0001048 A1* | 1/2003 | Taormina et al. | 244/158 R |
| 2003/0034422 A1* | 2/2003 | Higgins | 244/158 R |
| 2005/0178918 A1* | 8/2005 | Maeda et al. | 244/158 R |
| 2007/0250267 A1* | 10/2007 | Jaeger et al. | 701/226 |

* cited by examiner

*Primary Examiner* — Valentina Xavier

(74) *Attorney, Agent, or Firm* — Ronald E. Prass, Jr.; Prass LLP

(57) ABSTRACT

A method, a member satellite, and a tangible machine-readable medium are disclosed. An inter-satellite link subsystem 472 may maintain a fixed communication link between the member satellite and a partner satellite of the medium earth orbit centric satellite constellation in a regular, wraparound symmetric, spatially dimensional network. A terrestrial linking subsystem 476 may create a terrestrial link to a ground terminal.

20 Claims, 9 Drawing Sheets

100

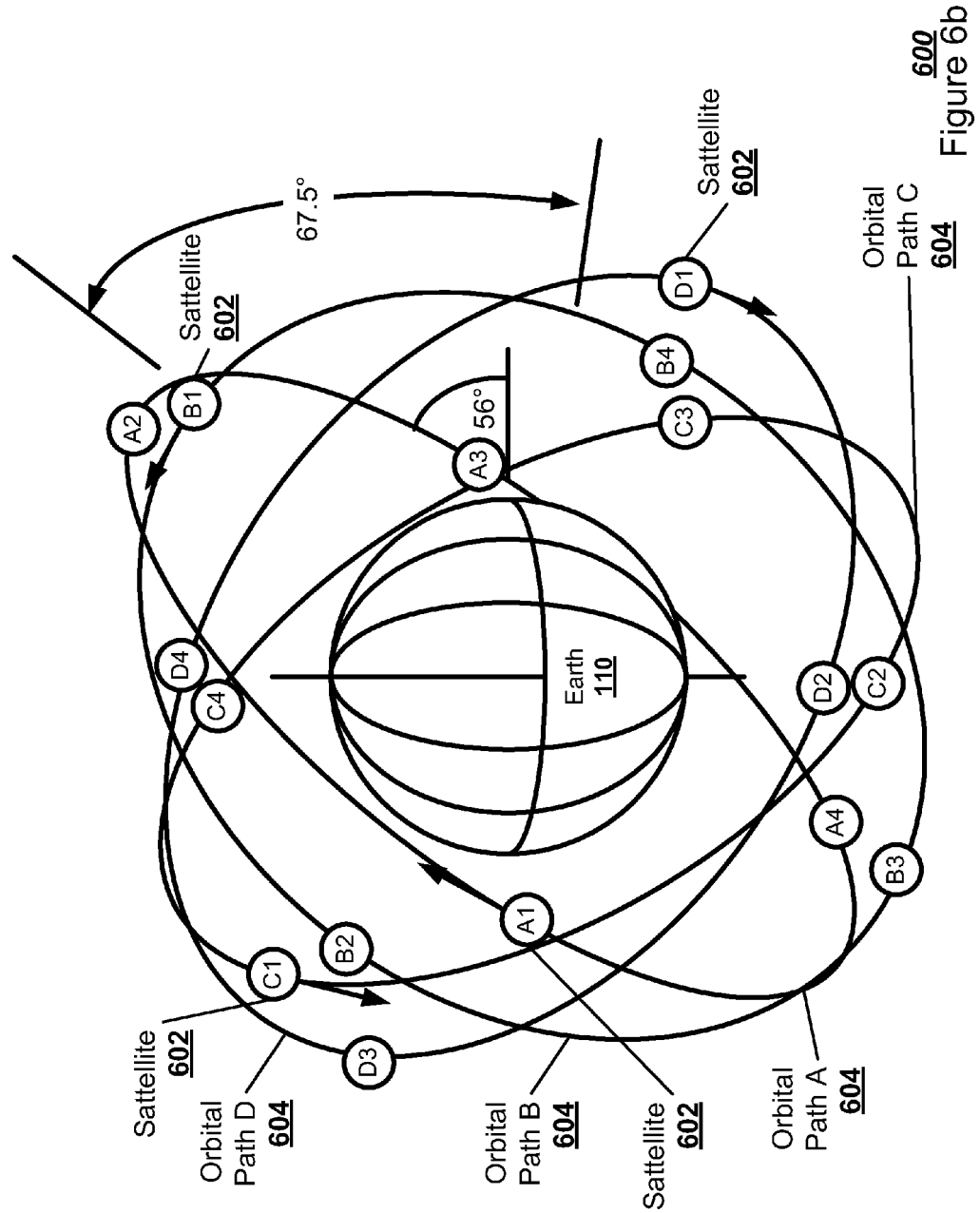

750

700

800

MEDIUM EARTH ORBIT CONSTELLATION WITH SIMPLE SATELLITE NETWORK TOPOLOGY

FIELD OF THE INVENTION

The present invention relates to a method and system for creating a satellite constellation. The present invention further relates to creating a medium earth orbit centric satellite constellation with a spatially dimensional network.

INTRODUCTION

Since the initial launch of Sputnik by the Soviet Union in 1957, thousands of artificial manmade objects, referred to as satellites, have been placed in orbit around the earth. The satellites may be placed in orbit from the cargo bay of a space shuttle or launched into orbit by a rocket. The rocket may place a satellite into orbit by launching to the desired height and then releasing the satellite once orbital velocity has been achieved. Once in orbit, the satellite may use a subsystem of thrusters to make necessary position adjustments and orbital corrections.

These satellites may be placed in a variety of orbits, such as low earth orbit (LEO), a medium earth orbit (MEO), and a geosynchronous earth orbit (GEO). A LEO satellite may refer to any satellite orbiting below 1500 kilometers from the surface of the earth, or generally any satellite orbiting below the inner Van Allen radiation belt. A MEO satellite may refer to any satellite orbiting between 8000 kilometers and 12,000 kilometers, or generally any satellite orbiting between the inner Van Allen radiation belt and the outer Van Allen radiation belt. A GEO satellite may refer to any satellite orbiting at 35,786 kilometers above the earth equator. The Van Allen radiation belts may be used to delineate between the different types of orbits as the inherent radiation present in these belts may cause the satellites to malfunction.

Orbits may also have other classifications, such as a highly elliptical orbit (HEO). A HEO may have a lowest altitude point, or perigee, a few hundred kilometers to earth. Additionally, the HEO may have a highest altitude point, or apogee, many thousand kilometers to earth.

SUMMARY OF THE INVENTION

A method, a member satellite, and a tangible machine-readable medium are disclosed. An inter-satellite link subsystem may maintain a fixed communication link between the member satellite and a partner satellite of the medium earth orbit centric satellite constellation in a regular, wraparound symmetric, spatially dimensional network. A terrestrial linking subsystem may create a terrestrial link to a ground terminal.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which:

FIGS. 6a-b illustrate, in a block diagram, one embodiment of the orbital path for a medium earth orbit centric satellite constellation.

DETAILED DESCRIPTION OF THE INVENTION

Figure 1:
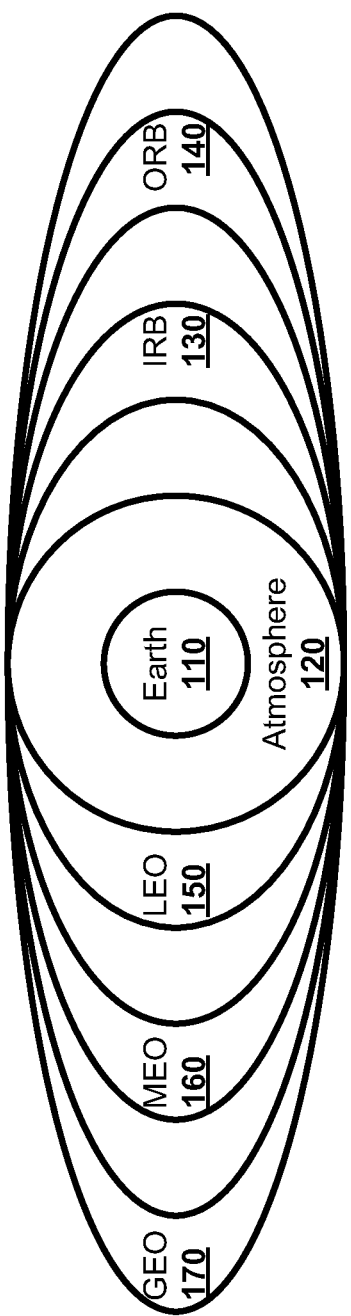
FIG. 1 illustrates, in a block diagram, various satellite orbit options.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

A medium earth orbit centric satellite constellation centralizes each member satellite in a medium earth orbit (MEO). The MEO centric satellite constellation may improve the coverage of an earthbound ground terminal, particularly when the satellites of the MEO centric satellite constellation are connected through inter-satellite links (ISLs) in a spatially dimensional network. The network topology for a MEO centric satellite constellation may be fixed, regular, and wrap-around symmetric. A fixed communication link is a relatively constant connection, as opposed to a link that is periodically operational. A periodically operational link may be temporarily deactivated, for example, due to blockage by earth or too great of an angular motion between the two connecting satellites. A regular network topology incorporates a repeating pattern of network nodes. A symmetric network topology in a two dimensional representation may have the same number of satellites and the same connection pattern on each side of a satellite, as oriented from left to right and top to bottom. When this symmetric network topology is projected onto a three dimensional surface, such as a globe, the symmetry may wrap around that three dimensional surface. A symmetric and regular network with fixed node-to-node connections may facilitate management and operations, such as routing messages across the network.

Each satellite may have four to six ISLs, or cross links, providing richer connectivity among satellites and allowing shorter delay between ground terminals than GEO systems. The MEO centric satellite constellation may further provide communications path redundancy and access diversity to ground terminals. The MEO centric satellite constellation may have four orbital planes with four satellites in each plane.

The orbital paths may have an inclination of 56 degrees and an altitude between 10,000 to 11,000 kilometers, such as 10,400 kilometers.

The MEO centric satellite constellation may be arranged to provide global, two-satellite coverage with a minimum eighteen degree elevation and a high probability of three satellite coverage at minimum eighteen degree elevation. Elevation may be measured relative to the horizon as viewed by the ground terminal. The three satellite coverage probability may be 60% on the equator and 100% near the poles. The network may have a simple symmetric topology, while connecting any two locations on earth in two or three hops.

Thus, a method, a member satellite, and a tangible machine-readable medium are disclosed in which an inter-satellite link subsystem may maintain a fixed communication link between the member satellite and a partner satellite of the medium earth orbit centric satellite constellation in a wrap-around symmetric spatially dimensional network. Additionally, a terrestrial linking subsystem may create a terrestrial link to a ground terminal.

FIG. 1 illustrates, in a block diagram, various satellite orbit options 110. Generally, the altitudes at which a satellite may orbit the earth 110 may be categorized based on the environmental factors affecting those orbits. The orbits of satellites may be high enough to get beyond the drag created by the earth's atmosphere 120. Additionally, the satellite may seek to avoid the torus of charged energetic particles, referred to as the Van Allen radiation belt, to avoid a negative effect on the electronics in the satellite by the radiation. The Van Allen radiation belt has an inner radiation belt (IRB) 130 and an outer radiation belt (ORB) 140. A satellite that is orbiting at an altitude between the atmosphere 120 and the IRB 130 of the Van Allen radiation belt may be referred to as having a low earth orbit (LEO) 150. A satellite that is orbiting at an altitude between the IRB 130 and the ORB 140 of the Van Allen radiation belt may be referred to as having a MEO 160. A satellite that is orbiting at an altitude of 35800 km above the earth's equator may be referred to as having a geosynchronous earth orbit (GEO) 170. A GEO 170 is beyond the ORB 140 of the Van Allen radiation belt.

A MEO centric satellite constellation may have slower relative motion between certain member satellites as compared to a LEO constellation. Slower angular motion and linear motion may allow inter-satellite links to be created and maintained more easily. Additionally, the view angle between two member satellites of the MEO centric satellite constellation with an ISL may be less than 180 degrees, allowing an ISL antenna or other types of sensors to be mounted on the side of satellite without any blockage by the satellite body. The side-mounting of ISL antennas may leave the earth-side of a satellite available for earth-facing sensors or antennas. The MEO centric satellite constellation may provide more efficient diversity coverage with far fewer satellites than a LEO satellite constellation.

Wideband mobile satellite communication systems may use line of sight (LOS). Such a system using a single GEO satellite may experience link intermittency with a blockage time of 15 to 25 percent in typical rural and urban environments and a 10 percent chance of a single blockage lasting four seconds or longer. The MEO centric satellite constellation, providing complete global two-satellite diversity coverage and a high probability of a three-satellite diversity coverage, may reduce the blockage time in the same environment to less than five percent and may reduce a single blockage of four seconds or longer to less than one percent. The MEO centric satellite constellation may also provide shorter communication paths than a GEO satellite system. In a GEO satellite system, global coverage with two-satellite coverage of a high degree service elevation angle, such as 18 degrees, with reasonably high latitude, such as 65 degrees, may be impractical due to the number of satellites used.

Figure 2:
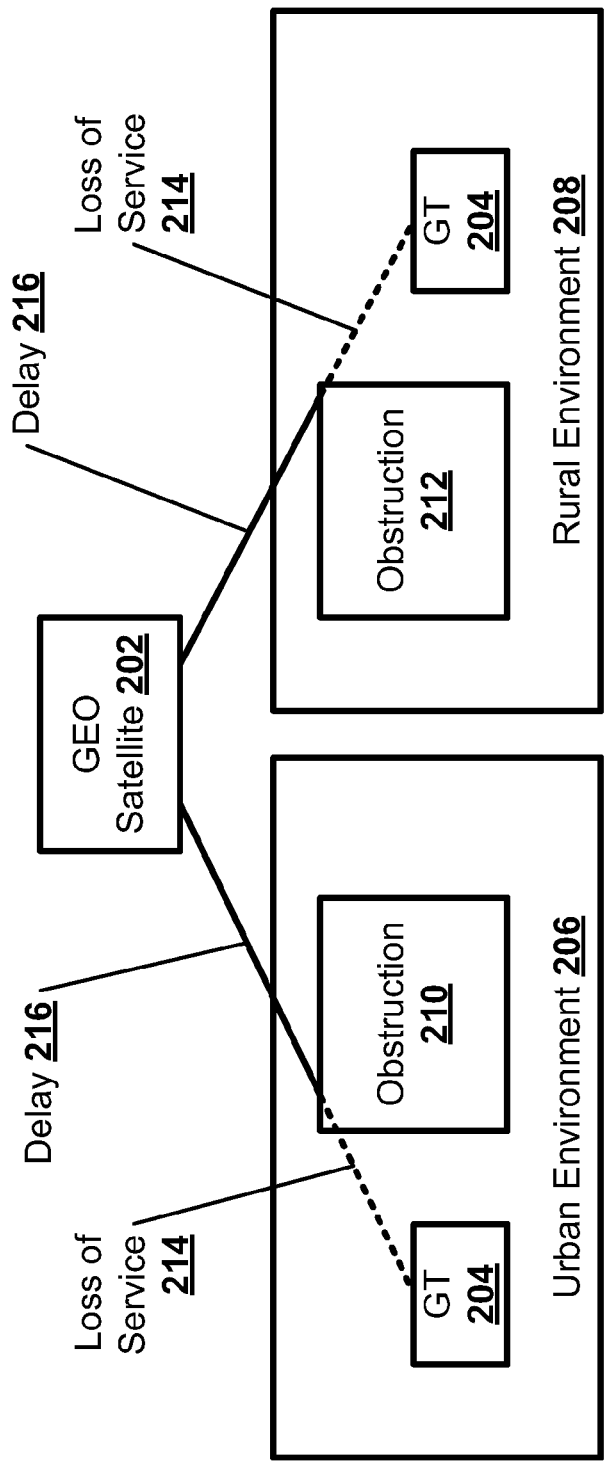
FIG. 2 illustrates, in a block diagram, one embodiment of the interaction between a geosynchronous earth orbit satellite and various ground terminals.

FIG. 2 illustrates, in a block diagram, one embodiment of the interaction 200 between a member satellite of a GEO satellite constellation and various ground terminals. A GEO satellite 202 may connect to a ground terminal (GT) 204 in an urban environment 206 or a rural environment 208. A GT 204 may transmit or receive data from a satellite. The urban environment 206 may have urban obstructions 210, such as a skyscraper or other buildings, which may prevent communication with the urban GT 204. The rural environment 208 may also have rural obstructions 212, such as a tree or a hill, which may prevent or impede communication with the rural GT 204. The urban GT 204 or the rural GT 204 may experience periods of loss of service 214 due to the urban obstructions 210 or the rural obstruction 212.

Additionally, because of the long distances that are involved, the urban GT 204 or the rural GT 204 may experience extensive delays 216 in receiving the transmission from the GEO satellite 202. Further, the long delay 216 may exacerbate link loss due to blockage because of a satellite 202 and a GT 204 exchanging messages during the recovery process for a blockage event. The GT 204 may have a harder time recovering from intermittency experienced during the long delay 216. Protocols, such as transmission control protocol (TCP), may have a very low transmission rate as a result of a lossy link.

Figure 3:
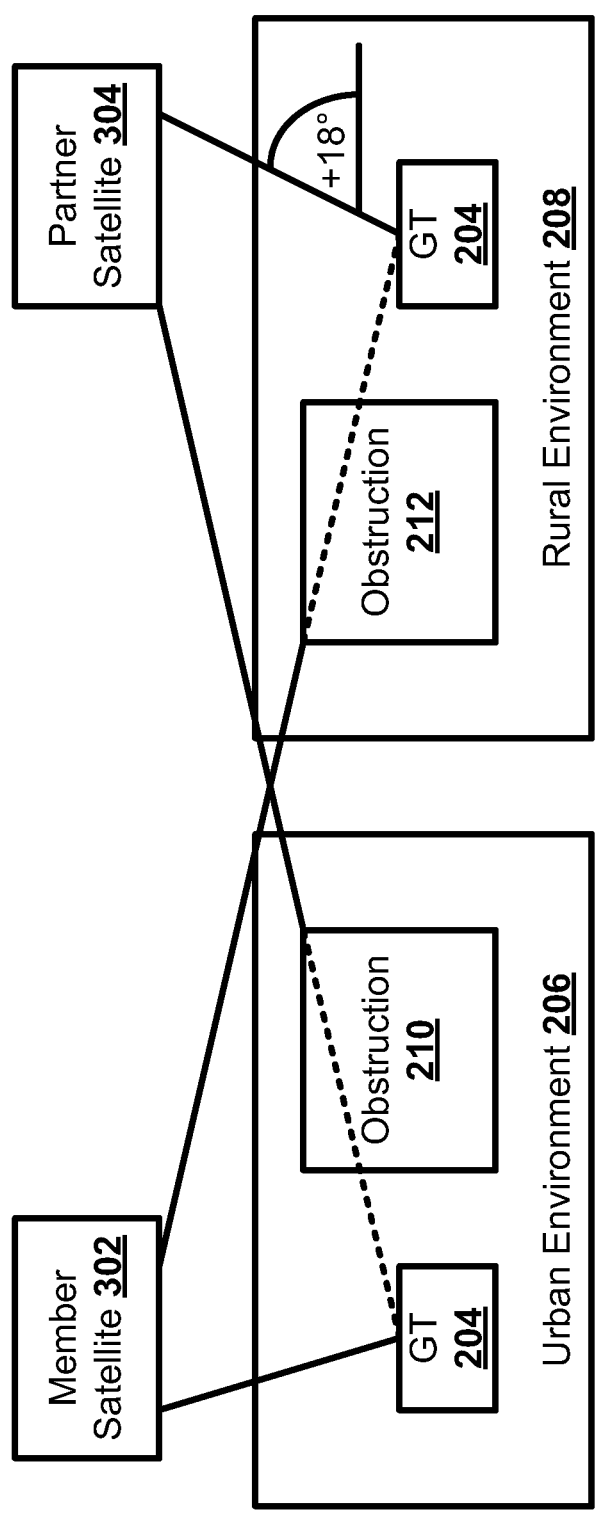
FIG. 3 illustrates, in a block diagram, one embodiment of the interaction between a medium earth orbit satellite constellation and various ground terminals.

In contrast, a MEO centric satellite constellation with a lower altitude may allow for a tighter constellation of satellites, providing shorter delays and higher link availability through multi-satellite diversity. FIG. 3 illustrates, in a block diagram, one embodiment of the interaction 300 between a MEO centric satellite constellation and various GTs 204. A MEO centric satellite constellation with an inclined orbit may provide diversity coverage, allowing multiple MEO satellites 302 to provide redundant coverage to the same location on earth. For example, if a member satellite 302 of a MEO centric satellite constellation is obstructed from connecting with a rural GT 204, a partner satellite 304 of the MEO centric satellite constellation may provide a less obstructed connection. The MEO centric constellation may greatly increase the likelihood that the GT 204 has access to a satellite with an elevation of eighteen degrees or higher above the horizon. With a higher elevation, communications signals may be less apt to be blocked. Additionally, the lower altitude for a member satellite 302 may greatly reduce the propagation delay to the urban GT 204 or the rural GT 204, not just for overall user information transport but also for recovery of an unlikely blockage.

The GT 204 may initiate a handover from a member satellite 302 to a partner satellite 304. The GT 204 may monitor all member satellites 302 of the MEO centric satellite constellation in view. The GT 204 may select the member satellite 302 with an optimal link quality to communicate. If a member satellite 302 with a previously optimal link quality becomes blocked, the GT 204 may switch to the partner satellite 304 with the next most optimal link quality. A handover may be triggered by the rising and setting of member satellites or a link blockage.

Figure 4:
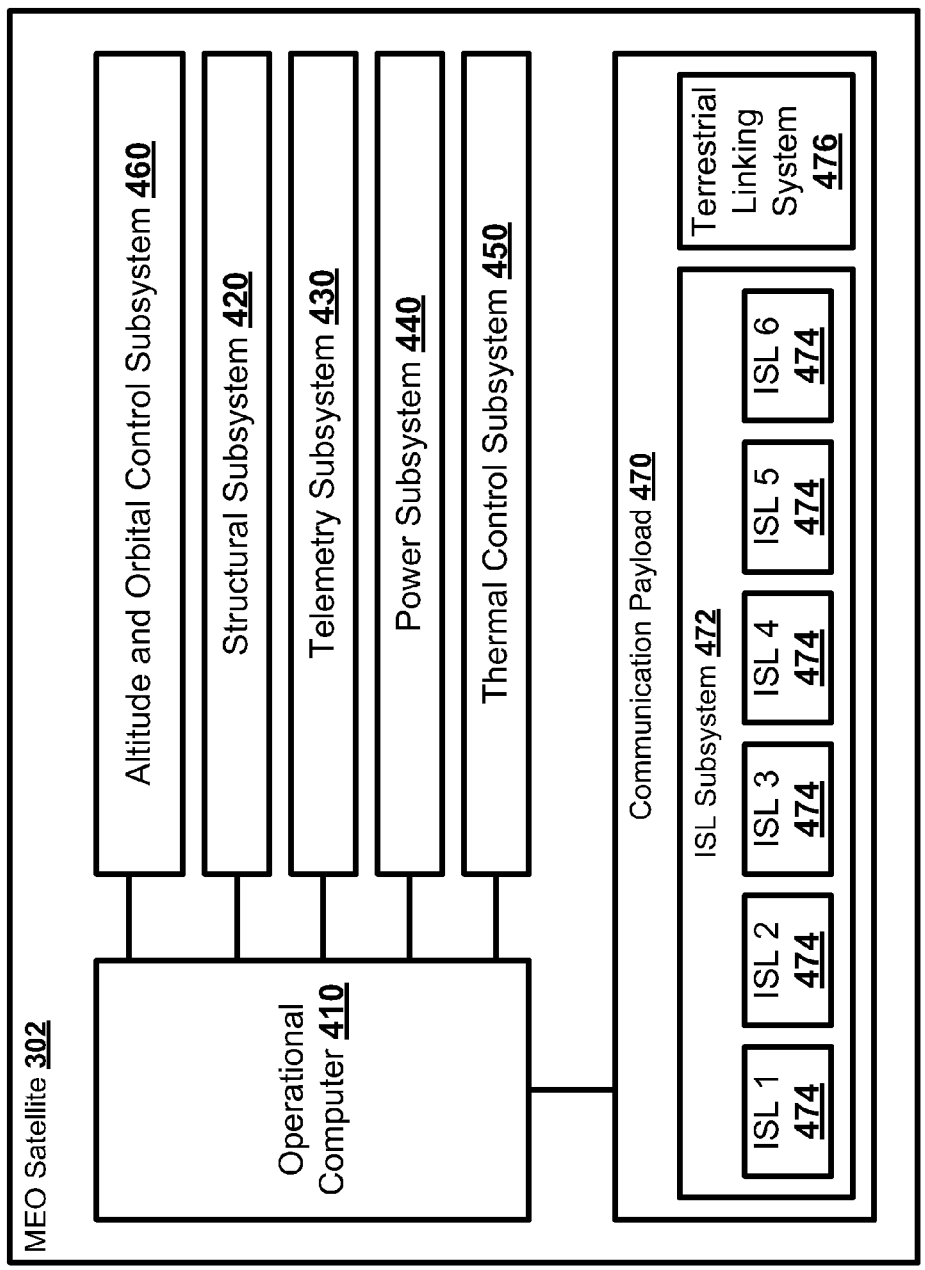
FIG. 4 illustrates, in a block diagram, one embodiment of a member satellite.

FIG. 4 illustrates, in a block diagram, one embodiment of a member satellite 302. While one example of a generic member satellite 302 layout is shown, any satellite capable of operating in a MEO may be used. The member satellite 302 may have an operational computer 410 administer the functions of the member satellite 302. The member satellite 302 may have a structural subsystem 420 to shield the member satellite 302 from meteorite damage and control spin functions. The member satellite 302 may have a telemetry subsystem 430 to monitor and control on-board equipment operations. The telemetry subsystem 430 may interact with a terrestrial control system. The member satellite 302 may have a power subsystem 440 to provide power for satellite operations. The power subsystem 440 may have a battery system or a set of solar panels. The member satellite 302 may have a thermal control subsystem 450 to protect the member satellite 302 from temperature extremes. The member satellite 302 may have an altitude and orbit control subsystem 460 to correct orbit and satellite position. The altitude and orbit control subsystem 460 may use a set of small thrusters to maneuver the member satellite 302.

The member satellite 302 may have a communication payload 470 to interact with a variety of different devices. The communication payload 470 may have an ISL system 472 that creates a communication link with other satellites in a MEO satellite network. The ISL system 472 may have any number of ISLs 474. For example, a member satellite 302 may have four to six ISLs 474, allowing the member satellite 302 to link to four to six partner satellites 304 in the MEO centric satellite constellation. Additionally, the communication payload may have a terrestrial linking system 476 to create one or more links with earthbound terminals.

Figure 5:
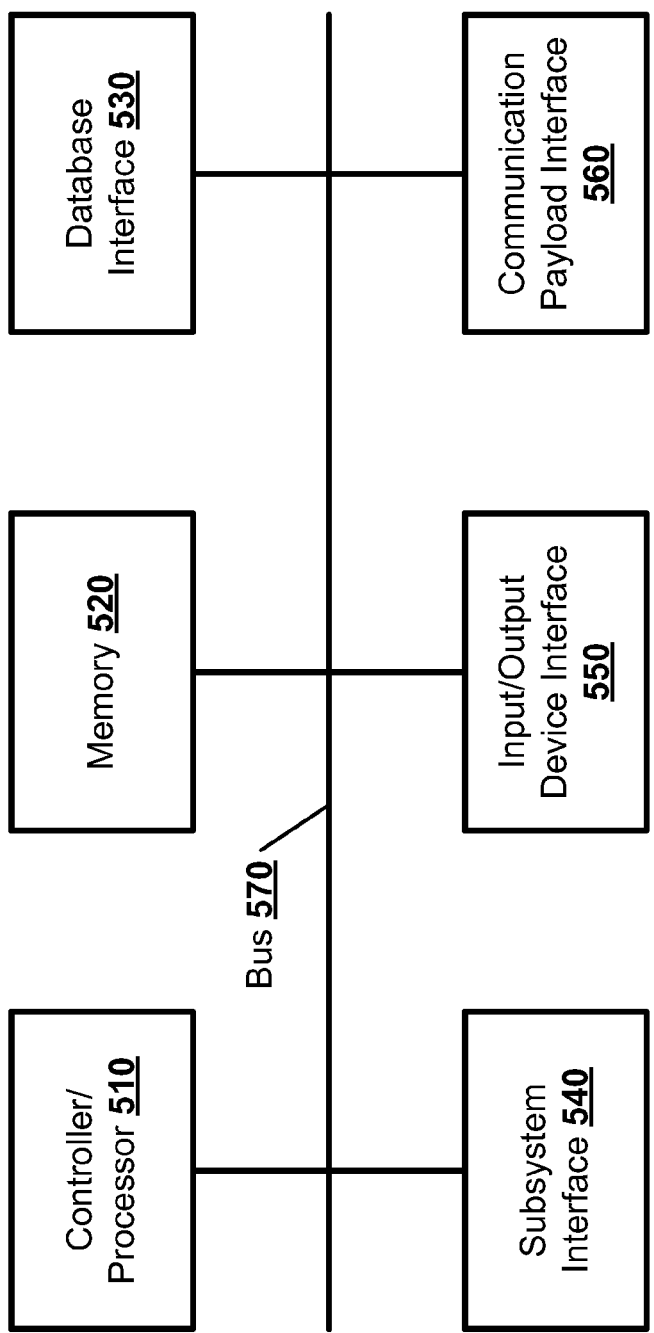
FIG. 5 illustrates, in a block diagram, one embodiment of an operation computer for a member satellite.

FIG. 5 illustrates a possible configuration of a computing system 500 to act as an operational computer 410. The operational computer 410 may include a controller/processor 510, a memory 520, a database interface 530, a subsystem interface 540, input/output (I/O) device interface 550, and a communication payload interface 560, connected through bus 570. The operational computer 410 may implement any operating system. Client and server software may be written in any programming language, such as C, C++, Java or Visual Basic, for example. The operational software may run on an application framework, such as, for example, a Java® server or .NET® framework The controller/processor 510 may be any programmed processor known to one of skill in the art. However, the disclosed method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the disclosed method as described herein may be used to implement the disclosed system functions of this invention.

The memory 520 may include volatile and nonvolatile data storage, including one or more electrical, magnetic or optical memories such as a random access memory (RAM), cache, hard drive, or other memory device. The memory may have a cache to speed access to specific data.

Data may be stored in the memory or in a separate database. The database interface 530 may be used by the controller/processor 510 to access the database. The database may contain orbital and network information. The subsystem interface 540 may allow the operational computer 410 to interact with various subsystems in the member satellite 302. The I/O device interface 550 may be any device that receives input and transmits results to a satellite operator. The communication payload interface 560 may connect the operational computer 410 to the communication payload 470. The components of the operational computer 410 may be connected via an electrical bus 570, for example, or linked wirelessly.

The communication and telemetry software and databases may be accessed by the controller/processor 510 from memory 520, and may include, for example, database applications, word processing applications, as well as components that embody the disclosed functionality of the present invention. The operational computer 410 may implement any operating system. Communication and telemetry software may be written in any programming language. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types.

Figure 6A:
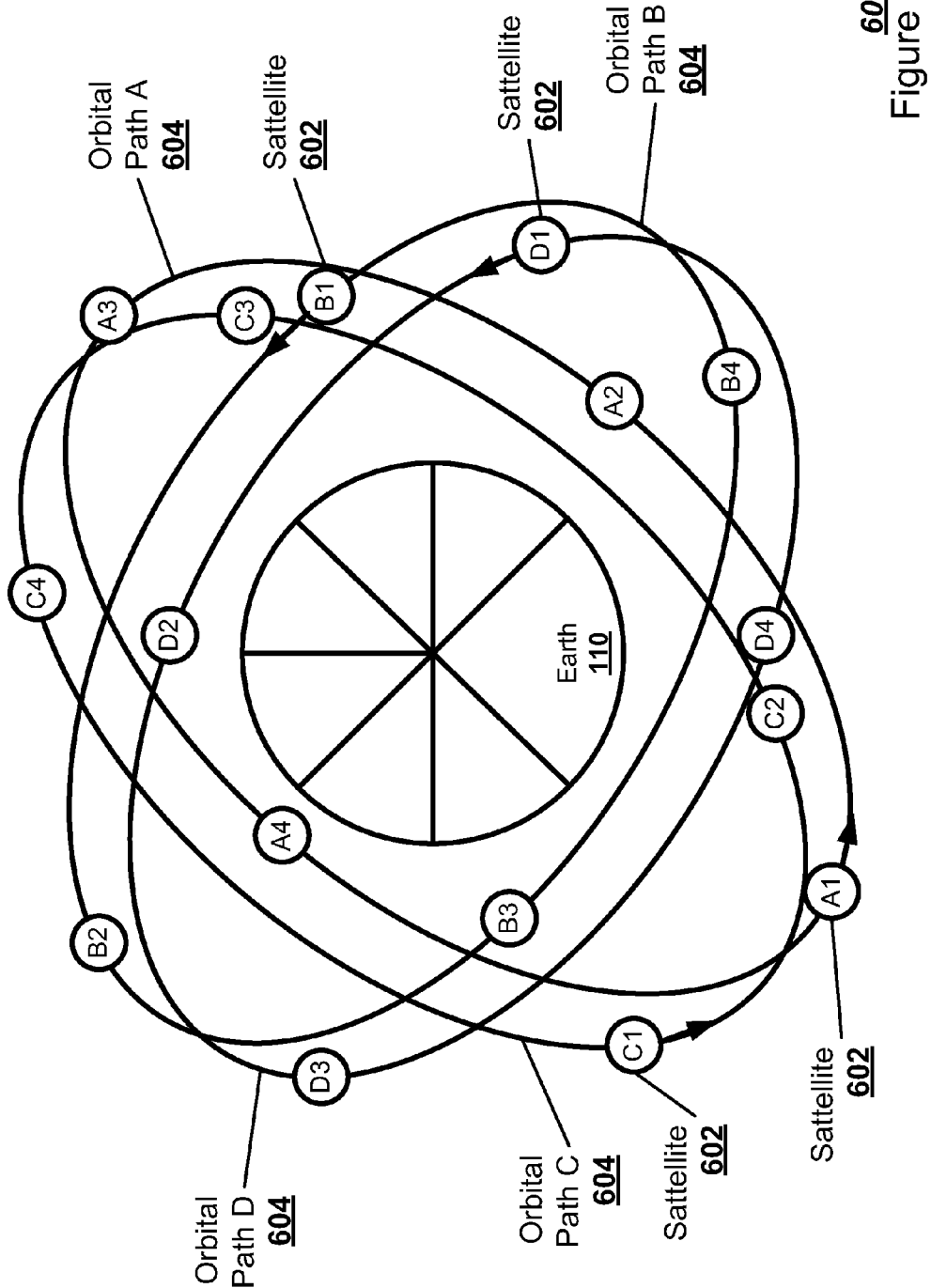

FIG. 6a illustrates in a polar view 600 and FIG. 6b illustrates in an equatorial view one embodiment of the orbital path for a MEO centric satellite constellation 600. The MEO centric satellite constellation 600 is a set of satellites 602 each having a medium earth orbit. Contrastingly, a GEO-MEO hybrid satellite constellation may have one or more satellites having a medium earth orbit and one or more satellites having a geosynchronous earth orbit. The MEO centric satellite constellation 600 may have a set of multiple orbital paths 604.

For example in a MEO centric satellite constellation 600 with sixteen satellites, the MEO centric satellite constellation 600 may have four orbital paths 604 with four satellites on each orbital path 604. The four orbital paths 604 may be labeled orbital path A 604, orbital path B 604, orbital path C 604, and orbital path D 604. The orbital paths may be oriented to have equal spacing from the adjacent orbital paths. In this example, as shown in FIG. 6a, each orbital path may have a ninety degree orientation from the two adjacent orbital paths, as measured from the ascending node of the orbital path. Additionally, the satellites may be evenly spaced in the orbital path. In this example, the four satellites in each orbital path may be spaced 90 degrees from each adjacent satellite in that orbital path. The four member satellites 602 of each orbital path 604 may be indexed, so that orbital path A 604 has satellite A1 602, satellite A2 602, satellite A3 602, and satellite A4 602; orbital path B 604 has satellite B1 602, satellite B2 602, satellite B3 602, and satellite B4 602; orbital path C 604 has satellite C1 602, satellite C2 602, satellite C3 602, and satellite C4 602; and orbital path D 604 has satellite D1 602, satellite D2 602, satellite D3 602, and satellite D4 602.

In this four orbital path configuration, each orbital path may have a 56 degree inclination relative to an equatorial orbit. Additionally, the first satellite in an orbital path may be offset 67.5 degrees, referred to as a phase offset, from the first satellite in an adjacent orbital path. For example, as shown in FIG. 6b, when satellite A1 602 is at the equator, satellite B1 602 is 67.5 degrees along orbital path B 604 from the equator, satellite C1 602 is 135 degrees along orbital path C 604 from the equator, and satellite D1 602 is 202.5 degrees along orbital path D 604 from the equator. For a different number of member satellites or a different number of orbital paths, the MEO centric satellite constellation may have a different orbital inclination or different phase offset between adjacent orbital paths.

Additionally, each satellite in the MEO centric satellite constellation 600 may be linked in a spatially dimensional network. FIG. 7a illustrates, in a block diagram, one embodiment of a spatially dimensional network 700. A spatially dimensional network 700, a network formed in 3-dimensional space among the member satellites 602, may connect certain satellites that have a direct line of sight to each other and slow relative motion. Each member satellite 602 in the spatially dimensional network may be connected to multiple other satellites, such as the four satellites shown. A member satellite 602 may have a first intra-orbital satellite link with a first adjacent satellite 602 on the same orbital path 604 and a second intra-orbital satellite link with a second adjacent satellite 602 on the same orbital path 604. For example, satellite A1 602 may be connected to satellite A4 602 and satellite A2 602. Additionally, the member satellite 602 may have a first inter-orbital satellite link to a first partner satellite 602 on a first adjacent orbit 604 and a second inter-orbital satellite link to a first partner satellite 602 on a second adjacent orbit 604. For example, satellite A1 602 may be connected to satellite B3 602 in orbital path B 604 and satellite D4 602 in orbital path D 604.

The relative angular and linear motion between these satellites may be slower than a LEO satellite constellation, easing link setup and maintenance. For example, satellite A1 602 may view satellite A2 602 and satellite A4 602 as stationary relative to satellite A1's 602 orbit. Satellite B3 602 and satellite D4 602 may remain in view of satellite A1. The angular motion between satellite A1 602 and satellite B3 602 and between satellite A1 602 and satellite D4 602 may be no more than about 0.03 degrees per second. The acceleration of linear motion between satellite A1 602 and satellite B3 602 and between satellite A1 602 and satellite D4 602 may be no higher than about 2.6 meters per second per second.

Figure 7B:
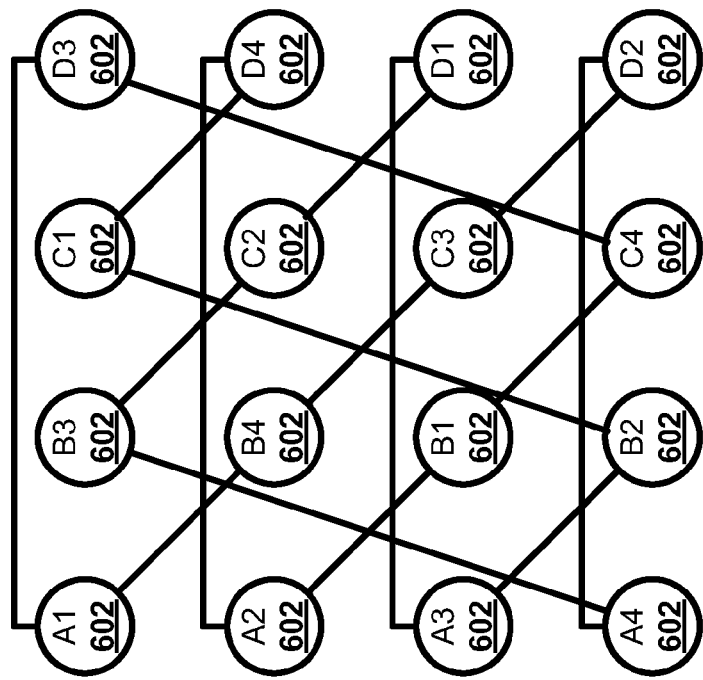
FIGS. 7a-b illustrate, in block diagrams, two embodiments of a spatially dimensional network.
Figure 7A:
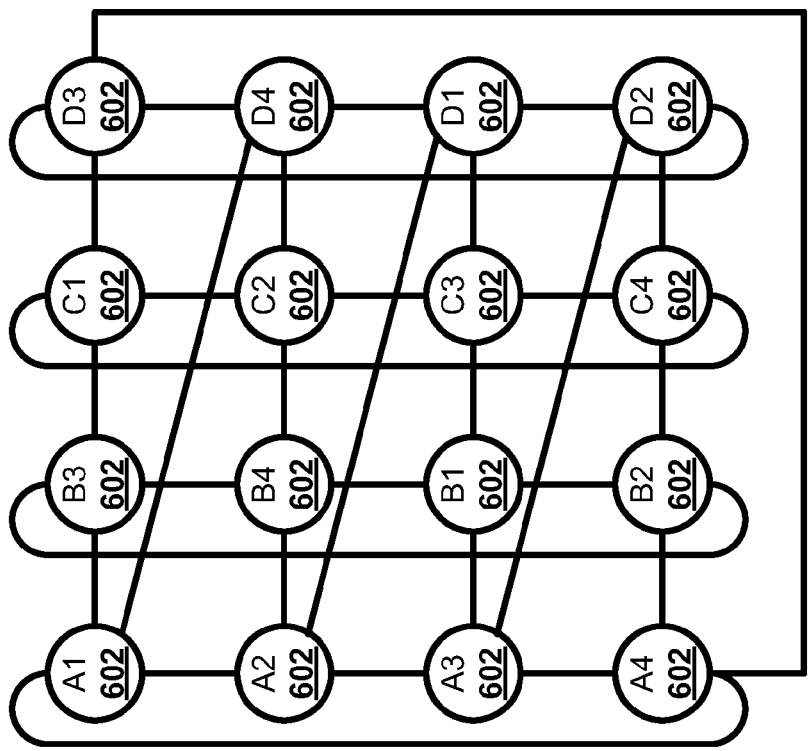

FIG. 7b illustrates, in a block diagram, an alternate embodiment of a spatially dimensional network 750. The connections of FIG. 7b may be present in addition to the connections of FIG. 7a, which have been left out of FIG. 7b for purposes of clarity. The MEO satellite 602 may have a third inter-orbital link to a second MEO satellite 602 on the first adjacent orbit 604 and a fourth inter-orbital link to a second MEO satellite 602 on the second adjacent orbit 604. For example, satellite A1 602 may be connected to satellite B4 602 in orbital path B 604 and satellite D3 602 in orbital path D 604.

While faster than the relative angular and linear motion between partner satellites shown in FIG. 7a, the relative angular and linear motion between these satellites may still be slower than a LEO satellite constellation, easing set up and link maintenance. Satellite B4 602 and satellite D3 602 may remain in view of satellite A1. The angular motion between satellite A1 602 and satellite B4 602 and between satellite A1 602 and satellite D3 602 may be no more than about 0.04 degrees per second. The acceleration of linear motion between satellite A1 602 and satellite B4 602 and between satellite A1 602 and satellite D3 602 may be no higher than about 3.7 meters per second per second.

Figure 8:
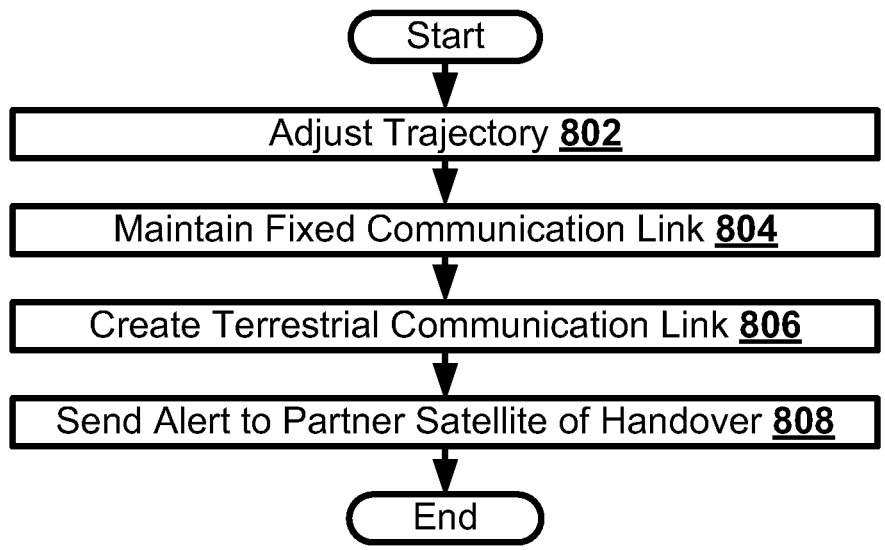
FIG. 8 illustrate, in a flowchart, one method for maintaining a medium earth orbit centric satellite constellation with a spatially dimensional network.

FIG. 8 illustrate, in a flowchart, one method 800 for maintaining a MEO centric satellite constellation with a spatially dimensional network. A launch platform, such as a rocket, may place a member satellite 602 in an orbital path of a MEO centric satellite constellation. The member satellite 602 of the MEO centric satellite constellation may be in a 56 degree inclined orbit with a 67.5 degree phase offset from an adjacent orbit. An inclined orbit is an orbit at an angle to the equator. The phase offset describes the degree phase difference between a similarly indexed satellite in an adjacent orbital path 604 in the MEO centric satellite constellation. An altitude and orbital control subsystem 460 may adjust the trajectory of the member satellite 602 to maintain a 56 degree inclined orbit, a 67.5 degree phase offset between adjacent orbits, and an altitude of 10,400 kilometers (Block 802). An ISL subsystem 472 may maintain a fixed communication link with a partner satellite 602 of the MEO centric satellite constellation resulting in a regular, wraparound symmetric, spatially dimensional network (Block 804).

A terrestrial link sub-system 476 may interact with a GT 204 to establish and maintain a communication session via a terrestrial link (Block 806). A member satellite 602 providing coverage may move away from coverage as a different member satellite moves in to coverage. The ground terminal may initiate a handover between member satellites of the MEO centric satellite constellation. Multiple member satellites having coverage of a GT 204 may be ready to provide communication service to the GT 204. The GT 204 may select the optimal partner satellite in view to communicate. The operational computer 410 may use the ISL subsystem 472 to send an alert to the partner satellite of a handover of the terrestrial link (Block 808). If terrain causes a sudden blockage between the GT 204 and a member satellite, the GT 204 may switch to another partner satellite in view.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. There may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method, comprising:
    maintaining a substantially constant communication link directly between a member satellite of a medium earth orbit centric satellite constellation and a partner satellite of the medium earth orbit centric satellite constellation via an inter-satellite link in a regular, wraparound symmetric, spatially dimensional network; and
    establishing a terrestrial link to a ground terminal.
2. The method of claim 1, wherein the medium earth orbit centric satellite constellation consists of sixteen satellites.
3. The method of claim 2, wherein the medium earth orbit centric satellite constellation is arranged in a four satellites by four orbital paths constellation.
4. The method of claim 1, further comprising:
    linking the member satellite directly to four partner satellites in the medium earth orbit centric satellite constellation.
5. The method of claim 1, further comprising:
    linking the member satellite directly to six partner satellites in the medium earth orbit centric satellite constellation.
6. The method of claim 1, wherein the member satellite is in an orbital path with a 67.5 degree phase offset from an adjacent orbital path.
7. The method of claim 6, further comprising:
    adjusting a position of the member satellite to maintain the 67.5 degree offset.
8. The method of claim 1, further comprising:
    sending an alert directly from the member satellite to the partner satellite of a handover of the terrestrial link.
9. A member satellite of a medium earth orbit centric satellite constellation, comprising:
    an inter-satellite link subsystem that maintains a substantially constant communication link directly between the member satellite and a partner satellite of the medium earth orbit centric satellite constellation in a regular, wraparound symmetric, spatially dimensional network; and
    a terrestrial linking subsystem that establishes a terrestrial link to a ground terminal.
10. The member satellite of claim 9, wherein the medium earth orbit centric satellite constellation consists of sixteen satellites.
11. The member satellite of claim 10, wherein the medium earth orbit centric satellite constellation is arranged in a four satellites by four orbital paths constellation.
12. The member satellite of claim 9, wherein the inter-satellite link subsystem links the member satellite directly to four partner satellites in the medium earth orbit centric satellite constellation.
13. The member satellite of claim 9, wherein the inter-satellite link subsystem links the member satellite directly to six partner satellites in the medium earth orbit centric satellite constellation.
14. The member satellite of claim 9, wherein the member satellite is in a 56 degree inclined orbital path.
15. The member satellite of claim 14, further comprising:
    an altitude and orbital control subsystem that adjusts a trajectory of the member satellite to maintain the 56 degree inclined orbital path.
16. The member satellite of claim 9, wherein the inter-satellite link subsystem sends an alert directly to the partner satellite of a handover of the terrestrial link.
17. A non-transitory tangible machine-readable medium having a set of instructions stored thereon that, when executed by one or more processors, cause the one or more processors to perform a method comprising:
    maintaining a substantially constant communication link directly between a member satellite of a medium earth orbit centric satellite constellation and a partner satellite of the medium earth orbit centric satellite constellation via an inter-satellite link in regular, wraparound symmetric, spatially dimensional network; and
    establishing a terrestrial link to a ground terminal.
18. The non-transitory tangible machine-readable medium of claim 17, wherein the medium earth orbit centric satellite constellation consists of sixteen satellites arranged in four satellites by four orbital paths.
19. The non-transitory tangible machine-readable medium of claim 17, the method further comprising:
    linking the member satellite directly to four partner satellites in the medium earth orbit centric satellite constellation.
20. The non-transitory tangible machine-readable medium of claim 17, wherein the member satellite is in a 56 degree inclined orbital path with a 67.5 degree phase offset from an adjacent orbital path.

* * * * *